UNITED STATES PATENT OFFICE.

RALPH DITTY, OF CLEVELAND, OHIO, ASSIGNOR TO BUCKEYE MILLING CO., OF CLEVELAND, OHIO, A CORPORATION.

CORE COMPOUND.

No. 803,566.  Specification of Letters Patent.  Patented Nov. 7, 1905.

Application filed January 5, 1905. Serial No. 239,794.

*To all whom it may concern:*

Be it known that I, RALPH DITTY, a citizen of the United States, residing at Cleveland, in the county of Cuyahoga and State of Ohio, have invented new and useful Improvements in Core Compounds, of which the following is a specification.

This invention is an improved compound to be used for making cores in molding, and it is composed of a mixture of the following materials in substantially the proportions stated:

To make a ton of the compound, I use one thousand and fifty pounds of wheat-flour, six hundred pounds of ground gypsum, one hundred and twenty-five pounds of fine sawdust, two hundred pounds of common salt, and twenty-five pounds of dextrine; total, two thousand pounds. Marble-dust may be substituted for the gypsum, if desired. These materials are thoroughly mixed in a dry powdered state, and the resulting compound will be found to make an excellent product for the purpose stated. The proportions may be varied without departing from the spirit of the invention, and equivalents may be used, if desired, for the various materials.

The binding qualities of this mixture are far superior to pure flour and to other compounds which have been brought to my attention. The function of the materials added to the flour is as follows: The sawdust is put in to make the cores open, so as to allow the gases generated when the metal is poured to escape freely. The dextrine and salt add binding qualities, and the latter also forms a hard crust on the outside of the cores. The gypsum or marble-dust is put in simply as a cheap filler.

What I claim as new, and desire to secure by Letters Patent, is—

A core composition consisting of flour, gypsum, sawdust, salt, and dextrine, in substantially the proportions stated.

In testimony whereof I have signed my name to this specification in the presence of two subscribing witnesses.

RALPH DITTY.

Witnesses:
JOHN A. BOMMHARDT,
LOTTIE NEWBURN.